July 29, 1947.     J. F. TOLK     2,424,724
POSITION DAMPENED SEISMOMETER
Filed July 27, 1945
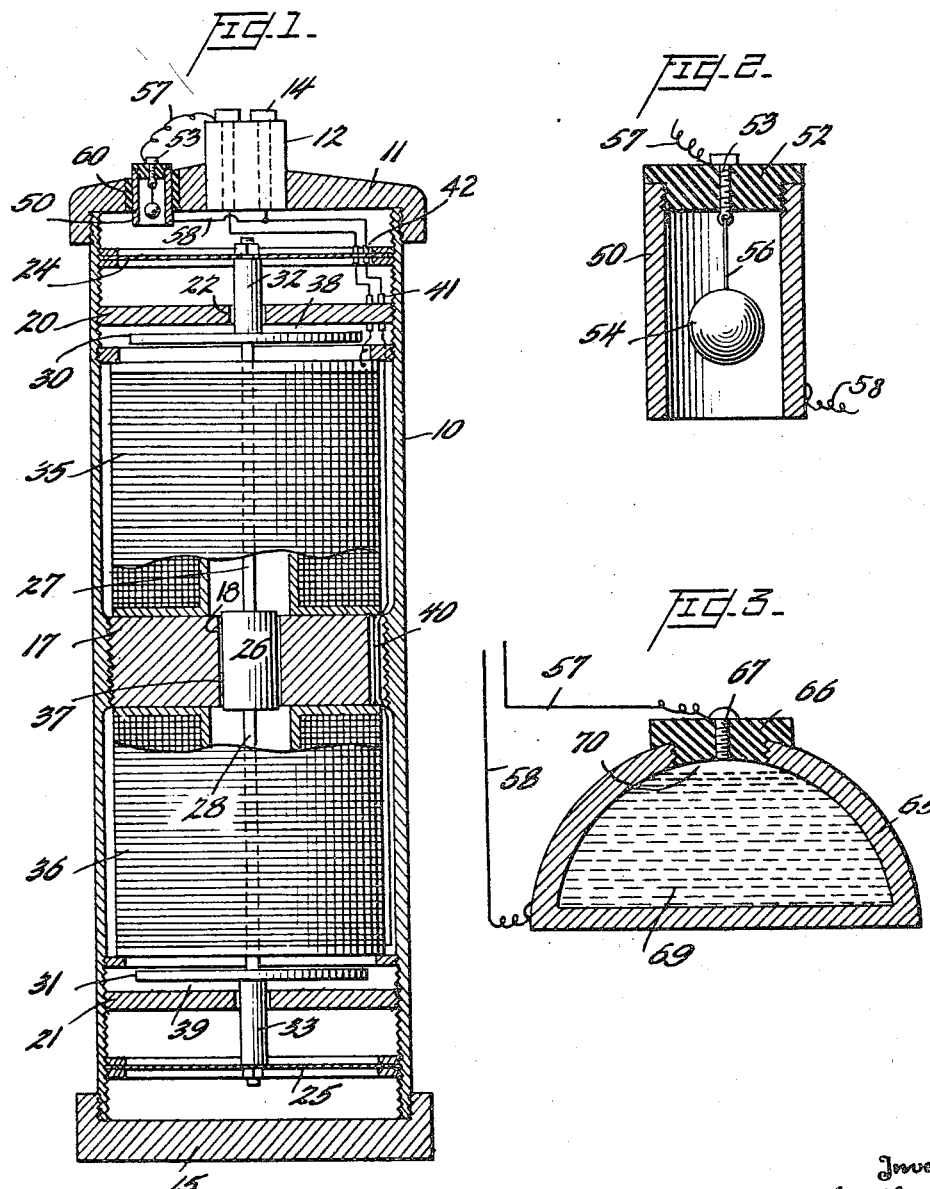
Inventor
John F. Tolk
By Watson, Cole, Grindle & Watson
Attorneys Patented July 29, 1947

2,424,724

UNITED STATES PATENT OFFICE 2,424,724

POSITION DAMPENED SEISMOMETER

John F. Tolk, San Antonio, Tex., assignor to Olive S. Petty, San Antonio, Tex.

Application July 27, 1945, Serial No. 607,398

3 Claims. (Cl. 177—352)

This invention relates to apparatus for use in seismic surveying and more particularly to improvements in instruments for converting seismic impulses into variable electric energy, such instruments being commonly referred to as seismometers, detectors, geophones, etc. It is the principal object of the invention to provide, in combination with a seismometer of the electromagnetic type, means whereby the magnetic damping of the instrument is automatically and substantially increased when the instrument occupies a position other than that which it normally occupies during operation.

More specifically, it is an object of the invention to incorporate with an electromagnetic seismometer an automatic switch in shunt with the seismometer winding, the switch being so arranged that when the seismometer occupies its usual operative position the switch is open, but when the seismometer is tilted, displaced, or inverted from the operative position, the switch is closed to short the seismometer winding, thereby substantially increasing the magnetic damping of the instrument and correspondingly reducing the rate of displacement of the movable element of the seismometer.

In delicate measuring instruments such as seismometers, it is essential that precautions be taken to prevent, limit, or retard displacement of the conventional movable mass when the instrument is not in use, so as to avoid strain and distortion of the instrument parts. It is common practice, for instance, to clamp the movable mass so as to prevent any displacement thereof. However, it can be shown that the rigid clamping of the mass is apt to impose on the suspending spring or other delicate parts of the instrument a force which causes hysteresis and drift in the spring, or distortion of such other parts. I have found that when the winding of an electromagnetic seismometer of fairly high normal damping is shorted, the damping is thereby increased to such an extent that the suspended mass can move only very slowly, the rate of movement being so low that the parts are not damaged in the course of ordinary handling and transportation.

As is well known, the electromagnetic seismometer usually consists essentially of a casing in which is yieldingly suspended, by springs or the like, a movable mass, sometimes called a steady-mass. A winding, and means for establishing a magnetic flux through the winding to induce current flow therein, are so operatively connected to the casing and the steady-mass that relative displacement of the casing and mass results in variation in the flux to vary the voltages developed in the winding. Consequently when the seismometer casing is supported on or near the surface of the earth, and seismic impulses are propagated in the earth by an explosive charge, these impulses are transmitted to the casing which thus partakes of motion with respect to the steady-mass. This relative motion is thereby converted into electrical energy by reason of the resulting variation in magnetic flux in the seismometer winding. The electrical energy is then amplified and recorded in the manner conventional in the art of seismic surveying.

There are a number of known methods by which the necessary variation in the magnetic flux may be obtained. For instance, either the winding or the means for establishing the magnetic field may be supported for displacement with respect to the casing, or the total flux may be altered by changing the reluctance of the magnetic circuit. The present invention is not limited as regards the particular method employed; the method chosen for the purpose of illustrating the invention involves variation in reluctance of the magnetic circuit, as described and claimed in United States Letters Patent to Parr, No. 2,311,079, granted February 16, 1943. It will be appreciated, however, that the invention is concerned essentially with the shorting or shunting of the seismometer winding whenever the seismometer is tilted or displaced from its operative position, and that the desired effect of substantially increasing the magnetic damping of the instrument is thereby obtained regardless of the method employed for generating the variable voltage or signal energy in the winding.

It is a feature of the invention that improper positioning of the seismometer, for instance the tilting of the instrument from the normal upright position on the ground, may be immediately detected at the recording station, the instrument being automatically shorted out unless properly located.

Further objects and features of the invention will be apparent from the following description taken in connection with the accompanying drawings in which, Figure 1 is a vertical sectional view through a seismometer of the magnetic type to which the invention is applied;

Figure 2 is an enlarged vertical sectional view of the automatic switch shown in Figure 1; and Figure 3 illustrates a modified form of shorting switch.

In order to facilitate an understanding of the invention, the specific embodiment shown in the drawings is described in detail. It will nevertheless be understood that restriction of the scope of the invention is not thereby intended, and that such changes and alterations are contemplated as would occur to one skilled in the art to which the invention relates.

Referring first to Figure 1 of the drawings, the seismometer is shown as comprising an outside shell or casing 10 of generally cylindrical shape. The casing is formed of a magnetic material, preferably soft iron or mild steel. It is closed at the upper end by a threaded cover 11, also of magnetic material such as cast iron, the cover containing an insulating plug 12 equipped with suitable terminal sockets 14 for the attachment of conductors for connection to an amplifier, and subsequently to a recording instrument, for instance a string galvanometer. The lower end of the casing is closed by a base 15 which may also be of magnetic material.

The casing 10 is incorporated in the magnetic circuit of the seismometer by mounting centrally of the length thereof a permanent magnet 17 of annular form. The magnet is closely fitted or threaded to the inner walls of the tube, is formed of alloy material suitable for the purpose, and is provided with a central cylindrical aperture 18, the walls of which constitute one pole, preferably the north, while the circumference of the annular disk constitutes the south pole. The magnet is thus quite short and should preferably be formed of some material of high coercive force.

The casing is also provided with a pair of annular pole-pieces 20 and 21 of identical construction, one arranged near the top and one near the bottom of the casing 10, as shown. They may also be threaded in the casing 10 or clamped between appropriate locking rings in any desired manner. They are preferably relatively thin disks of magnetic material each provided with a central opening 22.

In order to complete the magnetic circuit, the steady-mass of the seismometer is mounted coaxially in the casing and sprung between suitable supporting springs which, as shown, constitute thin diaphragm disks 24 and 25, one near each end of the casing and beyond the pole-pieces. These disks may be appropriately perforated and of the desired thickness to have such a resiliency that combined with the weight of the steady-mass they produce the desired natural frequency of oscillation most appropriate for operation under the conditions to which the seismometer is subjected. Obviously the steady-mass may be mounted by other known means and provided with such restoring forces as necessary to bias it toward a central position, as shown.

The steady-mass comprises a central or armature portion 26 in the form of a soft iron plug or cylinder closely filling the opening 18 in the magnet 17 but without touching the walls of the same. A pair of soft iron rods 27 and 28 extend respectively from the top and bottom centers of the armature and each carries at its outer end a disk 30 or 31, respectively, formed of suitable magnetic material of low retentivity as are all parts of the magnetic circuit except the permanent magnet. These disks are spaced inwardly only sufficiently from the inner faces of their cooperating pole-pieces 20 and 21 to permit the necessary relative movement between the sprung steady-mass and the casing under the action of seismic shocks without making actual contact and causing magnetic sticking of either disk to its pole-piece about which more will be said later. Each disk is attached to its adjacent diaphragm by means of a non-magnetic stud 32 or 33 which passes through the opening in the pole-piece as shown and is attached both to the disk and the diaphragm.

To complete the apparatus a signal winding comprising a pair of signal coils 35 and 36 is provided, one mounted in the casing above and the other below the permanent magnet. These coils each comprise a large number of turns of wire arranged on a spool having a central bore shown as of sufficient diameter to pass the armature cylinder 26 during assembly but with certain forms of construction this is not necessary and the coils can be of smaller diameter. The length of the spool is such as to occupy substantially all of the space between the permanent magnet and the pole disk on the steady-mass. The direction of winding of the conductors on the two coils 35 and 36 is opposite so that any stray fields, as previously described, which may penetrate the magnetic casing will generate voltages of opposite polarity in the two windings which are so connected together as to cancel out the effects. However, it will be understood that for the purposes of the present invention, only one winding will suffice.

The magnetic circuit of the seismometer consists really of two parallel magnetic circuits, the magneto-motive-force for which originates in the same central permanent magnet. The whole casing assumes the polarity induced in it by the periphery of the permanent magnet so that consequently the pole-pieces 20 and 21 are of the same polarity. The armature 26 has induced in it a polarity opposite to that of the central pole of the permanent magnet which in turn magnetizes the pole disks 30 and 31 to a like polarity opposite to that of the pole-pieces. The air gap 37 between the central pole of the permanent magnet and the armature 26 remains constant irrespective of vertical movement of the steady-mass, but the air gaps 38 and 39 respectively formed between the upper pole-piece and upper pole disk and the lower pole-piece and lower pole disk are adapted to be changed in size by seismic shocks and thus vary reluctance and hence the total flux flowing in their portion of the parallel magnetic circuits. It is to be noted particularly that these two gaps vary in size inversely so that any relative movement between the casing and steady-mass serves to increase one gap while the other decreases, but the sum of the two gaps, which are of equal size when the steady-mass is in repose, is always equal to a fixed distance.

Relative movement between the steady-mass and the casing decreases one air gap and increases the total flux in its portion of the magnetic circuit. At the same time the other gap increases and the total flux flowing in its circuit is reduced. The increase in flux generates a voltage by the changes of linkage in the cooperating coil while the decrease in flux produces a similar result in the other coil. The coils being wound in opposite direction and properly connected, give an additive summation of the generated signal voltages so that the output of the detector is almost twice that of a single coil type of detector. This increases materially the ratio of wanted to unwanted signals and permits the use of lower amplification between the seismometer and the galvanometer whereby superior results on the record are obtained.

It is previously stated that the two coils 35 and 36 are oppositely wound, but the same result can be obtained by winding them in the same direction and making the appropriate connections which will cause a summation of the signal voltages and a bucking of the stray field voltages. The coils being connected in series, the several conductors pass through a slot 40 in the permanent magnet and a hole 41 in the pole-piece 20 and through appropriate openings 42 in the upper diaphragm and are led to the terminal screws 14 in the insulation plug.

It will be appreciated that if the impedance of the circuit in which the seismometer winding is included is substantially reduced, for instance, by shorting the winding, the electromagnetic damping which resists relative displacement of the steady-mass and casing will be correspondingly increased, movement of the mass resulting in the development of an electromotive force opposing such movement. A seismometer such as that described hereinbefore may be so designed that when the winding is shorted the mass may require as long a period as several seconds to return to the central position from the maximum deflected position. Under these circumstances, the seismometer may be subjected to rough handling and may be conveniently carried without special precautions but without damage to the delicate parts thereof.

The increased damping necessary to achieve this result may often be secured by the use of a low-impedance shunt rather than a direct short of the winding, and the shunt or short may be applied to a part only of the winding. Since this is readily understandable, reference will be made hereinafter, for convenience, to the shorting of the winding, it being understood that one skilled in the art may resort to obvious expedients without departing from the scope of this language.

A device for shorting the winding will now be described, reference being made to Figure 2, which comprises an enlarged representation of the device shown in Figure 1. It consists essentially of a generally cylindrical metallic housing 50, in one end of which is threaded a cap 52 of insulating material. Suspended from the cap by means of a screw 53 is a pendulous member 54, which may be generally spherical in shape and is formed of metal or other conducting material, the supporting stem 56 for the member 54 being connected to the screw 53 so as to permit the member 54 to swing freely in any direction. The stem 56 and the screw 53 are also formed of conducting material and are connected to one of the terminals 14 by a wire 57; the casing 50 is electrically connected to the other terminal 14 by a wire 58. The casing and the enclosed pendulous member may be mounted in an insulating bushing 60, which is fitted in the cover 11 of the seismometer in such manner that when the seismometer is placed in operative upright position on or in the earth, the member 54 is suspended out of contact with the casing 50, in which position it is shown in Figures 1 and 2. If, however, the seismometer is tilted, laid on its side for transportation, or inverted for carrying, the pendulous member 54 swings into contact with the casing 50, thus shorting the seismometer winding with the results hereinbefore described. As pointed out, not only is the instrument protected from damage by reason of the high electromagnetic damping afforded, but when the seismometer is improperly positioned in use, so as to lean to one side or the other, this can be detected by a check at the amplifying and recording station, so that the instrument may be properly positioned.

In Figure 3 is shown a modified form of switch, adapted to be mounted in or on the seismometer casing, consisting essentially of a hemispherical conducting casing 65 having an opening in the upper portion thereof, in which is threaded an insulating closure member 66, the latter receiving a conducting screw 67. The casing 65 is nearly filled with mercury or other conducting liquid, leaving a small space 70 in the upper part of the casing adjacent the screw 67. The screw 67 and the casing 65 are connected respectively through the wires 57 and 58 to the leads from the seismometer winding. It will be apparent that any tilting of the seismometer shorts the winding in the same manner as hereinbefore described with reference to the switch shown in Figures 1 and 2. Other types of gravity-operated switches may be employed in lieu of those disclosed herein, the switch being in each instance so constructed as to permit a predetermined and desired amount of tilting before the winding is shorted.

It will be perceived that other forms of level actuated switch may be employed, it being only necessary to connect the switch terminals across the winding of the seismometer and to so position the switch on the casing that the circuit through the switch is closed whenever the seismometer is displaced from the normal position, which is the position permitting generally vertical vibration of the steady-mass.

Having thus described the invention, what is claimed as new and desired to be secured by Letters Patent is:

1. In apparatus for use in seismic surveying, the combination with a seismometer of the magnetic type including a casing, a steady-mass resiliently suspended in the casing for reciprocal movement with respect thereto, and a signal generating winding in which current flow is induced in response to relative movement between the casing and the steady-mass, of a switch mounted on said casing and responsive to change in position thereof for shorting said winding whenever said casing occupies a position other than that which permits reciprocal movement of said steady-mass in a substantially upright path.

2. In apparatus for use in seismic surveying, the combination with a seismometer of the magnetic type having a signal generating winding in which electrical currents are induced in response to earth vibrations, of a device carried by said seismometer and automatically operable to short said winding whenever said seismometer is displaced from the normally operative, upright position.

3. In apparatus for use in seismic surveying, the combination with a seismometer of the magnetic type including a casing, a steady-mass resiliently suspended in the casing for reciprocal movement with respect thereto, and a signal generating winding in which current flow is induced in response to relative movement between the casing and the steady-mass, of a level actuated switch mounted on said casing, said switch having the terminals thereof connected across said winding and being so positioned on said casing that the circuit through the switch is open only when said casing occupies the normal upright position in which said steady-mass may vibrate in a generally vertical path.

JOHN F. TOLK.

REFERENCES CITED

The following references are of record in the file of this patent:

UNITED STATES PATENTS

| Number | Name | Date |
| --- | --- | --- |
| 2,013,251 | Pierson | Sept. 3, 1935 |
| 1,681,756 | Whitlow | Aug. 21, 1928 |
| 2,307,792 | Hoover | Jan. 12, 1943 |
| 2,311,079 | Parr | Feb. 16, 1943 |
| 1,301,434 | Heitman | Apr. 22, 1919 |